United States Patent [19]
Huvey et al.

[11] Patent Number: 5,830,400
[45] Date of Patent: Nov. 3, 1998

[54] METHOD OF MANUFACTURING A HOLLOW STRUCTURE FOR STORING PRESSURIZED FLUIDS

[75] Inventors: Michel Huvey, Bougival; Jean-Francois Le Page, Rueil Malmaison, both of France

[73] Assignee: Institut Francais du Petrole, Rueil Malmaison, France

[21] Appl. No.: 568,360

[22] Filed: Dec. 6, 1995

Related U.S. Application Data

[63] Continuation of Ser. No. 162,944, Dec. 8, 1993, abandoned, which is a continuation of Ser. No. 692,196, Apr. 26, 1991, abandoned.

[30] Foreign Application Priority Data

Apr. 26, 1990 [FR] France ................................. 90 05507

[51] Int. Cl.⁶ .......................... B29C 53/34; B29C 63/18; B29C 71/02
[52] U.S. Cl. .......................... 264/254; 264/267; 264/295; 264/296
[58] Field of Search ............................ 138/122; 264/259, 264/254, 269, 267, 294, 295, 296, 261, 339, 347, 236

[56] References Cited

U.S. PATENT DOCUMENTS

| | | | |
|---|---|---|---|
| 2,998,985 | 9/1961 | Burns et al. ........................... | 264/287 |
| 3,966,646 | 6/1976 | Noakes et al. ......................... | 264/287 |
| 4,091,063 | 5/1978 | Logan .................................... | 264/103 |
| 4,158,586 | 6/1979 | Usui ....................................... | 264/313 |
| 4,205,034 | 5/1980 | Newberry .............................. | 264/257 |
| 4,360,493 | 11/1982 | Kramer, Sr. et al. .................. | 264/292 |
| 4,400,338 | 8/1983 | Rundo ................................... | 264/287 |
| 4,687,690 | 8/1987 | Menzel .................................. | 138/122 |
| 4,746,386 | 5/1988 | Sato ....................................... | 264/295 |
| 4,754,781 | 7/1988 | Jan de Putter ........................ | 138/122 |
| 4,780,946 | 11/1988 | Palazzo ................................. | 264/251 |
| 4,804,019 | 2/1989 | Kramer, Jr. ............................ | 264/286 |
| 4,811,761 | 3/1989 | Huvey ................................... | 138/122 |

FOREIGN PATENT DOCUMENTS

| | | |
|---|---|---|
| 2604768 | 4/1988 | France . |
| 2630464 | 10/1989 | France . |

*Primary Examiner*—Angela Y. Ortiz
*Attorney, Agent, or Firm*—Antonelli, Terry, Stout & Kraus, LLP

[57] ABSTRACT

A method for manufacturing a hollow structure suitable for example as reservoir for pressurized fluids, which structure is obtained by curving over a part of its length a corrugated tube provided circumferentially in the hollow of its waves with a hardenable fiber reinforced composition, then subjecting the tube thus curved over at least a part of its length to a treatment for hardening the hardenable composition. The tube may comprise longitudinal reinforcements (braid or layers of widely spaced helical wires), the ends of the tube being possibly equipped with systems for communicating with the outside or for sealing, the final shaping being followed by a treatment for hardening said composition. The winding of the tube may be carried out about a central core or drum.

6 Claims, 2 Drawing Sheets

METHOD OF MANUFACTURING A HOLLOW STRUCTURE FOR STORING PRESSURIZED FLUIDS

This application is a continuation application of application Ser. No. 08/162,944, filed Dec. 8, 1993, now abandoned, which application is a continuation application of application Ser. No. 07/692,196, filed Apr. 26, 1991 (now abandoned).

BACKGROUND OF THE INVENTION

Compressed gases are transported in pressure resistant sealed cylinders. These cylinders are often made from steel, and the weight of the container represents from about ten to more than fifteen times the weight of the compressed gas transported when the cylinder is full. The weight of a unitary cylinder is limited by the need to be able to handle the cylinder manually, when the cylinder is to be placed in positions not accessible by mechanical means.

When the user has mechanical handling means at his disposal, or when the position of use, is directly accessible by the delivery trucks, these cylinders are often gathered together in a compact unit called "a frame". Such frames are of considerable weight, for example, more than 20 kN for a frame containing 189 m TPN of nitrogen under a pressure of 20 MPa (weight of the nitrogen contained: 236 daN).

It is obvious that such frames forming unitary indissociable assemblies can be made in a totally different way, and not by gathering together standard unitary cylinders.

One of the, problems encountered when increasing the diameter of the cylinders for increasing their capacity for a constant length is that the end portions must be hemispherical so as to have a minimum weight for a given, capacity and flat for the case of handling, at least in so far as the lower end portion is concerned.

Since the case of handling is the dominant requirement, the lower bottom is therefore flat or substantially flat and its thickness does not increase as the diameter of the container, but as its cube, so as to conserve acceptable deformations. Consequently, the weight of the container increases much more quickly than the unitary capacity of the cylinder.

SUMMARY OF THE INVENTION

The method of the invention makes it possible to obtain frames having the same capacity but much lighter for a comparable bulk, or frames with the same weight, but of a very much higher capacity.

Other applications of the structures obtained in accordance with the method of the present invention may of course be produced without departing from the scope of the invention.

The invention is based on the use of a container of great length and small diameter, which may be wound helically on a reel, whose central core may itself be a standard cylinder, or a light cylinder of more recent design.

One of the problems encountered with the use of a wound tube when it is subjected to an internal pressure is natural tendency of the tube to straighten, with this phenomenon being related to the oval shape which the tube assumes when it is bent for spooling the tube on the reel.

Under the effect of the internal pressure, the tube tries to recover a circular shaped cross section, which can only be obtained by opening the turns.

It is practically impossible to wind a tube made from an homogeneous material without making it oval, which makes it a dangerous spring if it is held in a curved position under pressure. Furthermore, even held curved, the small axis of the ellipse corresponding to a cross section of the oval shaped tube tends to swell considerably to try and recover the circular cross section when it is subjected to an internal pressure, which means that the radial swelling (with respect to the reel) is considerable.

It is consequently necessary to provide appreciable spaces between two tube layers so that this type of tube can breathe.

These limitations means that such storage, in the form of a tube wound on a reel, has never been used.

Reinforced corrugated tubes, such as described in the French patent FR 2 553 860 (U.S. Pat. No. 4, 811, 761) have the particular character of maintaining a circular cross section when they are curved, and consequently do not develop a straightening torque when they are subjected to pressure in the curved position.

For the same reason, the diameter variation of the corrugated tube in the radial direction of the reel is limited to the lengthening of the circumferential reinforcement of the corrugated tube, or about 1% in the case where the reinforcement is formed of glass fibers E, and lower when carbon fibers are used.

The spaces to be diametrally maintained will then be much smaller and the interpositioning of a layer of elastomer between the core and the first tube layer, then between the first and second layers and so on, allows normal breathing of the tube if the reinforced tube comprises an elastomer sealing sheath, by its local deformation it may compensate for the variation of diameter of the tube between its rest state and its pressurized state.

It has however been observed that the internal pressure resistant properties of such a circumferentially and longitudinally reinforced corrugated tube are considerably lowered when it is manufactured in a straight position as described in aforesaid patent and used in a very highly curved position, as is the case for the internal layers in a transportable storage installation such as may be obtained according to the invention.

The method of the invention allows a hollow structure to be manufactured, particularly suitable for storing pressurized fluids which, although being in the form of a plurality of turns of a curved tube, has a high internal pressure resistance.

It also makes it possible to obtain pressurized fluid transfer tubes having only very few pressure resistance losses when they comprise zones with very small radii of curvature, when such zones may be determined beforehand, which is the case, for example, of tubes to be placed permanently in a structure such as a trench or the framework of a building or for storing pressurized fluid in a vehicle, for example, using the hollow spaces of the bodywork of a vehicle.

The method of manufacturing in accordance with the present invention comprises the steps of filling the hollow external portions of a flexible corrugated structure over at least a part of their height with a composition comprising a fiber reinforced hardenable resin, shaping the filled tube to provide at least a curved portion of a length thereof and to give the tube a shape corresponding to the use for which the tube is intended, and subjecting the thus shaped tube to a hardening treatment for hardening the fiber reinforced hardenable resin.

According to preferred alternatives, some of which may be carried out simultaneously, the flexible tube fixed with the hardenable composition may be covered with a sheath made from a material substantially impermeable to the resin, so as to maintain the resin substantially in position in the external hollow portions of the corrugated tube, before widening the tube, and/or the resin may be a heat hardenable resin and the hardening treatment may be performed by heating the assembly forming the flexible tube to a temperature for hardening the resin.

The resin, during impregnation, contains a cross-linking material and the assembly is maintained, during the hardening treatment, under conditions allowing the cross-linking to occur. Moreover, after the step of filling and before the step of shaping, a layer having a higher mechanical strength than that of the sheath may be disposed about the tube filled with the hardenable composition and may or may not be provided with the sheath of a material substantially impermeable to the resin.

It is also possible for the layer to be formed of a braid of high mechanical strength fibers, and the shape for use may comprising a plurality of turns wound on a drum. Additionally, the radius of curvature of the tube, during formation of the turns, may be chosen so that the closest turns are moved closer to the winding axis and the furtherest turns are moved away from the axis, without however causing a crushing of the tube which would substantially reduce a tube diameter in a direction perpendicular to the axis.

The winding is effected about a substantially cylindrical hollow container in communication with the winding, and the cylindrical hollow container can form a part of a storage volume. The respective ends of the tube may be provided with systems for communicating with the outside or for sealing.

The invention is not limited to the use of a particular heat hardenable resin. A resin may, for example, be mixed with a hardener for impregnating the filaments which will serve for filling the external hollow portions of the corrugated tube, and then heated in the curved position of the tube. Vulcanization may also be used by filling the waves with filaments previously impregnated with latex to which sulfur has been added and heated after winding of the tube. A formo-phenolic resin, a melamine formaldehyde resin, a urea-formaldehyde resin, an epoxy resin, a polyester or vinylester resin, or an alkyde resin may be used, or rovings formed of a mixture of reinforcing fibers and thermoplastic meltable fibers such as polyamide or polyethylene fibers, or rovings of reinforcing fibers coated with meltable thermoplastic resin powder may be placed in the external hollow portions of the corrugated tube, and then, after winding, heat treatment may be applied so as to cause the thermoplastic to melt before cooling for hardening the assembly.

The sheath, if deposited, may be a simple helical winding of a strip of plastic or elastomer material having a small thickness, since this strip, after hardening of the resin, has normally no role to play.

In these figures, for the sake of simplicity, the free ends of the tube have not been shown, which may be equipped with connections, such as those described in the French patent FR 2 604 768.

DESCRIPTION OF THE PREFERRED EMBODIMENTS

Figure 1:
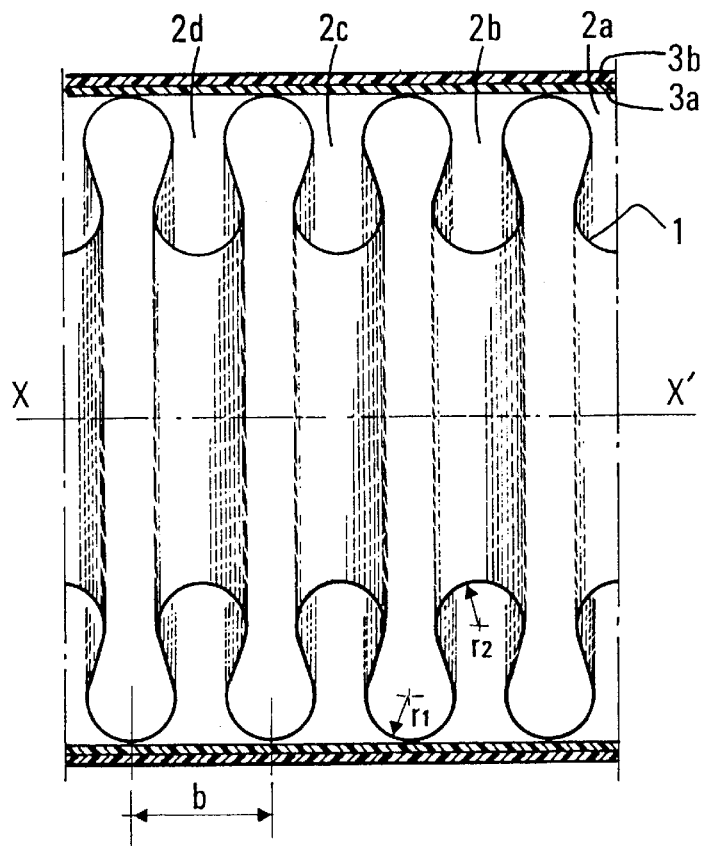
FIGS. 1 is a partial cross section of a straight corrugated tube portion, along a longitudinal axis XX' of tube, constructed in accordance with the present invention

In FIG. 1, the entire height of the hollow portions 2a, 2b, 2c of the straight corrugated tube are filled with resin, but it is also possible to fill only a portion, from the bottom as far as the zone where the radius of curvature of the external zone of the corrugation of the sheath becomes substantially constant.

The crosses locate the centers of the successive circle portions which form the corrugations, with these circle portion being separated or not by portion which are substantially rectilinear seen in section, and corresponding to substantially conical zones, in spatial representation.

The form shown, made up of successive half circles, is not obligatory and any other form may be used, provided that it comprises flutes. An "bellows" type structure, may thus be, used.

In this case, the hollow portion may be filled over substantially the whole of its height.

The successive hollow and relief portion, may form successive rings or adopt a helical shape.

The support form of the winding, when its is material, may have the shape of a drum with constant radius, but may also take on different shapes, such as an oval drum, a crate, or even have straight portions followed by portions with a high radius of curvature, such as a hollow metal frame or a trench dug out in an urban environment.

During manufacture, starting with the straight corrugated tube 1, at least one reinforcement element impregnated with a hardenable resin is deposited in the hollow portions 2a, 2b, 2c of the tube 1. The entire tube 1 may be covered with a protective layer, for example, a thin strip of helically wound rubber 3a and a longitudinal reinforcement, for example a metal wire braid 3b.

Figure 3:
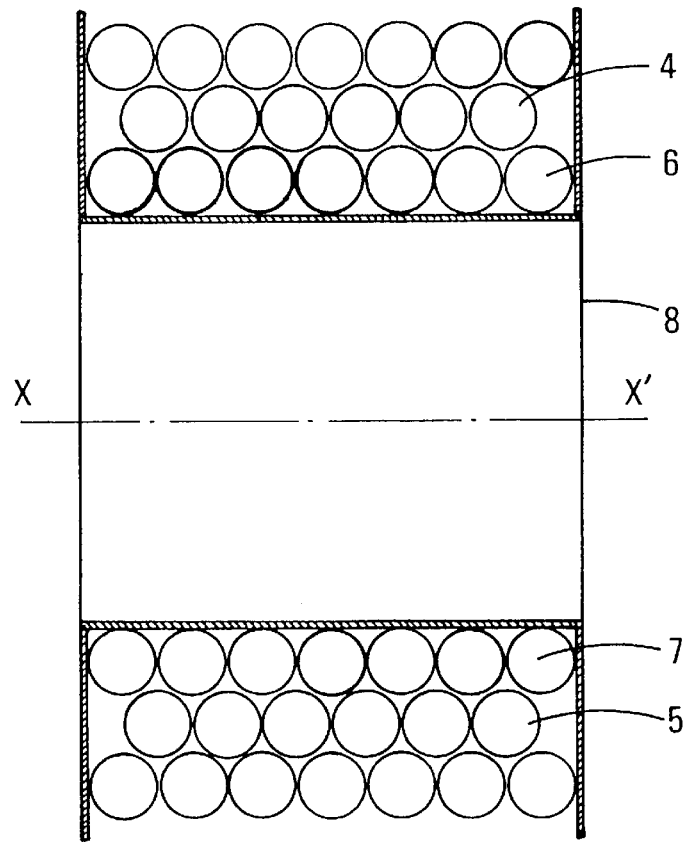
FIG. 3 is a schematic view of fluid storage structure obtained using the method of the invention.
Figure 2:
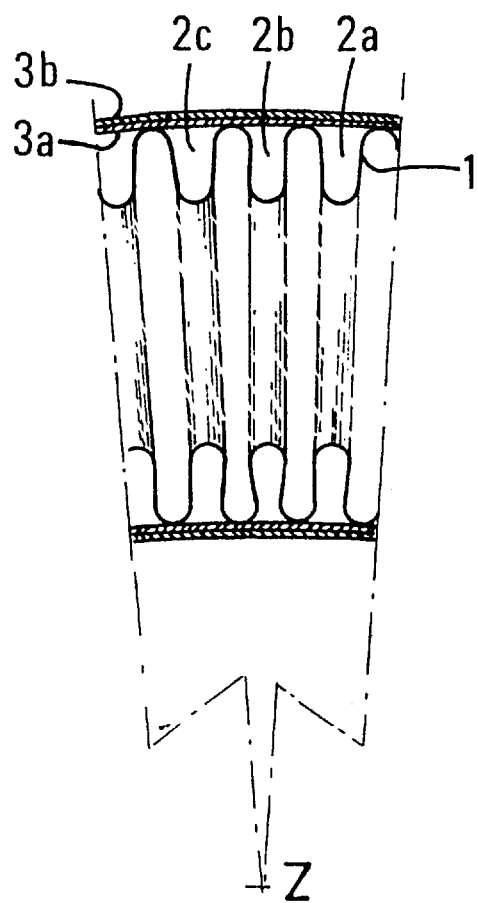
FIG. 2 is a cross section the tube portion of after FIG. 1 winding about an axis Z.

Tube 1 is wound about a drum whose axis, perpendicular to the figure, passes through point Z (FIG. 2) of the axis Y'Y (FIG. 3). Since the resin has not taken on its final form, the impregnated reinforcement element is still deformable, and the shape of its cross section, initially such as shown in FIG. 1, takes on an appearance similar to that of FIG. 2.

The assembly formed by the support drum when it is present and the, wound tube is then subjected to hardening treatment.

The hardening treatment, when it results from a temporary rise in temperature, may be carried out by enclosing the assembly thus formed in an oven, but it may also be achieved, for example, by introducing a fluid inside the tube at the treatment temperature and at a pressure such that the sheath alone, reinforced only by the longitudinal reinforcement such as the metal braid, may withstand it during the necessary treatment time.

By comparison with the prior art, a tube having an inner diameter of 49 mm, an outer diameter of 56 mm, formed of corrugated vinylidene polyfluoride sheet 0.5 mm thick whose external hollow portions are filled over almost the entire height with glass fibers E impregnated with an epoxy composition, with the impregnation being carried out in accordance with the method described in the French patent FR 2 630 464, the hardening having been carried out conventionally, the tube then having been reinforced longitudinally with an aramide braid and equipped with connections in accordance with the French patent FR 2 604 768, has a bursting pressure of 14 MPa when it is subjected to forces in the straight (linear) position. Bursting occurs by piercing of the vinylidene polyfluoride sheath at the top of the external wave.

Manufactured in the same way, with the same products, its bursting pressure is only 7 MPa when it is subjected to forces in a curved position, with a radius of curvature of 35 cm (laid on a reel having a barrel diameter of 70 cm).

It has been observed that this same tube, manufactured with the same materials and held in the same curved position, had a bursting pressure of 12 MPa (15% loss only instead of 50%), if the procedure for stabilizing (hardening) the epoxy resin, in this case heating in an oven, were carried out by positioning the flexible tube, which has not been oven cured, in the position in which the test will be carried out, and carrying out stabilization of the resin in this position.

A flexible tube of the same diameter, formed with a stainless steel corrugated sheath of 0.25 mm thick, manufactured stabilized and tested in the straight position, has a bursting pressure 63 MPa. It is then possible to use it as a storage tube working under 20 to 21 MPa. Manufactured and stabilized when straight, but tested when curved (same radius of curvature as above), its bursting pressure is reduced to 35 MPa, which is too low for use at 20 to 21 MPa. Manufactured in the straight position, but stabilized after curvature, this same flexible tube has a bursting pressure of 60 MPa (the loss is now only 5%), and may be used with such a curvature as storage container for gases compressed at 20 MPa.

A weight, of the tube equipped with the aramide braid and an external rubber sheath 1 mm thick, is 12.55 N/m for an internal volume of 2.015 dm $^3$/m. For an internal storage volume of 1 m$^3$, 496 meters of this tube must be used, representing a weight of 623 daN.

This tube, wound on a reel with an external barrel diameter of 0.5 m and barrel length of 1.85 m, is distributed over six layers for an external diameter slightly less than 1.2 m. This reel, whose barrel and flanges are made from sheet 5 mm thick, itself weighs 186 daN. With its stiffeners and handling hooks, the carrier device reaches a weight of 235 daN, which makes a total empty weight of 858 daN, which compares advantageously with, the empty weight of 784 daN, of the conventional "frame", however of a smaller capacity.

The purpose of the connection devices such as described in French patent FR 2 604 768 mentioned above, is to ensure the constancy of the diameter over the whole length of the tube, so as to avoid any pressure loss prejudicial to correct flow of the fluids. They will be used preferably when the purpose of the tube is to transfer fluids.

Other connection systems, less costly and only providing a reduced flow section with respect to the section of the tube, but of the same order of size as the cross section of compressed gas supply ducts, may be used without departing from the scope of the invention, when the structure in accordance with the invention is intended for storing compressed gases.

Is is possible, when the structure according to the invention results from winding a corrugated tube filled in the external hollow portions with a hardenable composition about an axis, and before or after the hardening treatment, to introduce a composition capable of expanding about the turns of the winding, and then to cause the composition to foam. If such a foals composition is formed from phenyl resins or other resins exhibiting good behaviour in the case of fire, the storage thus obtained will, at least temporarily, be protected from heating in the case of fire.

The invention will be better understood from the following example.

Using known methods, a corrugated tube is formed whose circumferential wave has the following characteristics:

| Characteristics | | Value |
|---|---|---|
| internal radius of the internal wave | r1 | 1.25 mm |
| internal radius of the external wave | r2 | 1.25 mm |
| internal radius of the tube | r3 | 24.5 mm |
| thickness of the corrugated sheath | a | 0.25 mm |
| nature of the corrugated sheath | | stainless steel |
| modulus of elasticity of the sheath | | 210 000 MPa |
| breaking stress of the sheath | | 450 MPa |
| weight per unit volume of the sheath | | 7,800 kg/m$^3$ |
| pitch of the corrugation | b | 5.5 mm |

Using a device without center, in the hollow of the waves a roving is wound continuously formed of glass fibers pre-impregnated in a vacuum with an epoxy composition formed of 100 parts of bisphenol A diglycidylether, to which 90 parts of methylendomethylenetetrahydrophtalic anhydride and 2 parts of benzyldimethylamine have been added. This pre-impregnated body was kept in a freezer at a temperature of –18° C. temperature an hour before its use.

About each wave a sufficient number of turns is formed for filling it practically completely, before passing to the next wave.

After filling of the waves, the filled corrugated tube passes into a taping machine which wraps it with a thin sheet of vulcanized elastomer of EPDM type.

The product thus protected against flow of the resin passes into a braiding machine which forms an aramide braid thereabout, then into a wrapping machine which deposits on its surface a ribbon of vulcanized rubber of nitrile rubber type 1 mm thick.

The tube thus formed, and equipped at its first end with a plugged connection, is wound on a steel drum of an inner diameter of 0.5 m and a length of 0.85, equipped with circular flanges having an external diameter of 1.2 m. Thus, in six layers a tube length is formed of practically 500 m having a total internal volume of 1000 dm$^3$. The end second end is equipped with a connection with a threaded hole for receiving for receiving a valve, and disposed so that this threaded hole for is subsequently accessible without difficulty and the whole is placed in an oven of sufficient size, then brought progressively, at a temperature rise rate of 2° C. per minute, to a temperature of 140° C. This temperature is held for an hour, then heating is stopped and the assembly removed from the oven. Then a threaded plug is placed in the threaded hole of the connection.

About this assembly is placed a polythene tube 2 mm thick and 1.3 m in diameter and between the drum thus equipped and the polyethylene tube an expandable phenyl resin based composition is caused to flow which occupies the space available between the tube serving as reservoir and the polyethylene tube, and a part of the free space between the different turns of the tube.

Then the plug protecting the threaded hole is removed and a valve is positioned for connection to a water network for filling the whole with water and for realizing internal pressure test at a pressure of 30 MPa. This pressure is maintained without apparent dimensional modification of the assembly.

The reservoir thus formed is then emptied of the greater part of its water, then placed in the oven which served for curing it so as to heat it, and connected to a vacuum source for total drying of the duct, before being used for storing compressed gas at a pressure of 20 MPa.

The epoxy glass composite material rings formed by winding the composition do not have a constant shape where the tube is bent. The material rings have a substantially constant cross section, but their width (measured in the longitudinal direction of the tube) and their height (measured in the radial direction of the tube) vary substantially inversely proportionally with respect to each other, the zone of the rings situated in the tube portion directed towards the center of the curvature having the cross section with the greatest height and the smallest width, and the zone directed towards to outside of the tube having the greatest width and the smallest height.

In the case of helical corrugations, the variation of width and correlatively of height is substantially periodic.

What is claimed is:

1. A method of storing a pressurized fluid in a hardened curved corrugated hollow structure disposed around a hollow space, the method comprising the steps of:

filling hollow external portions of a flexible corrugated tube over at least a part of a height of the respective hollow external portions of the flexible corrugated tube with a composition comprising a fiber reinforced hardenable resin, covering the flexible corrugated tube filled with said fiber reinforced hardenable resin with a sheath of material substantially impermeable to said resin to maintain the resin substantially in position in said external hollow portions of the flexible corrugated tube, placing the flexible corrugated tube, subsequent to the filling of the hollow external portions and subsequent to covering the filled hollow external portions, around the hollow space to curve the corrugated tube over at least a portion of a length of the flexible corrugated tube, and subjecting the flexible corrugated tube, to a hardening treatment for hardening the fiber reinforced hardenable resin to form the hardened curved corrugated hollow structure; and storing pressurized fluid in the hardened corrugated hollow structure.

2. The method as claimed in claim 1, wherein the hardening treatment includes heating said flexible corrugated tube to a temperature for hardening the resin.

3. The method as claimed in claim 1, wherein the hardenable resin, during filling of the hollow portions contains a cross-linking material, and wherein the step of subjecting the flexible corrugated tube to a hardening treatment includes maintaining the flexible corrugated tube under conditions allowing cross-linking to occur.

4. The method as claimed in claim 1, further comprising providing ends of a hardened flexible corrugated tube structure with closures and means for communicating with the interior of the hardened flexible corrugated tube structure through the closures.

5. A method for storing pressurized fluid in a hardened curved corrugated hollow structure having a curved portion, the method comprising the steps of:

providing a flexible corrugated tube having hollow external portions;

filling the hollow external portions of the flexible corrugated tube over at least a part of a height of the respective hollow external portions with a composition comprising a fiber reinforced hardenable resin;

covering the flexible corrugated tube filled with said fiber reinforced hardenable resin with a sheath of material substantially impermeable to said resin to maintain the resin substantially in position in said external hollow portions of the flexible corrugated tube;

bending the flexible corrugated tube subsequent to the filling of the hollow external portions and subsequent to covering the filled hollow external portions to provide at least one curved portion in a length of the flexible corrugated tube;

subjecting the corrugated tube having the at least one curved portion, subsequent to the bending step, to a hardening treatment for hardening the fiber reinforced hardenable resin to form the hardened curved corrugated hollow structure; and storing pressurized fluid in the hardened corrugated hollow structure.

6. The method as claimed in claim 1, wherein said hardened curved corrugated hollow structure is placed in hollow spaces of a body of a vehicle.

* * * * *